(12) United States Patent
Todasco et al.

(10) Patent No.: US 11,461,780 B2
(45) Date of Patent: Oct. 4, 2022

(54) SHARED AUTHENTICATION FOR LIMITED USE OF AN ASSOCIATED ACCOUNT BASED ON USER LOCATION AND CONNECTED DEVICES

(71) Applicant: PAYPAL, INC., San Jose, CA (US)

(72) Inventors: Michael Charles Todasco, Santa Clara, CA (US); Anand Lakshmanan, Sunnyvale, CA (US); Patrick Wong, San Mateo, CA (US); Brandye Cassandra Sweetnam, San Jose, CA (US); Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 212 days.

(21) Appl. No.: 16/436,797

(22) Filed: Jun. 10, 2019

(65) Prior Publication Data
US 2019/0311365 A1 Oct. 10, 2019

Related U.S. Application Data

(63) Continuation of application No. 14/806,525, filed on Jul. 22, 2015.

(51) Int. Cl.
| | |
|---|---|
| *G06Q 40/00* | (2012.01) |
| *G06Q 20/40* | (2012.01) |
| *G06Q 20/32* | (2012.01) |
| *G06Q 20/14* | (2012.01) |
| *G06Q 20/22* | (2012.01) |

(52) U.S. Cl.
CPC ........ *G06Q 20/4014* (2013.01); *G06Q 20/14* (2013.01); *G06Q 20/227* (2013.01); *G06Q 20/322* (2013.01); *G06Q 20/3224* (2013.01); *G06Q 20/4015* (2020.05)

(58) Field of Classification Search
CPC ..................................................... G06Q 40/00
USPC ........................................................ 705/44
See application file for complete search history.

(56) References Cited

U.S. PATENT DOCUMENTS

2018/0004930 A1* 1/2018 Csinger ............... H04L 63/0853

* cited by examiner

*Primary Examiner* — Ojo O Oyebisi
(74) *Attorney, Agent, or Firm* — Haynes and Boone, LLP

(57) ABSTRACT

There are provided systems and methods for shared authentication for limited use of an associated account based on user location and connected devices. A user may own a location where another user may visit or rent. The user may have a payment account that may be used with merchants to purchase items that are associated with the location or offered with use of the location. The user may set up the payment account to have a shared authentication mechanism with other users that utilize the location to allow the other users to pay for items using the payment account. The authentication mechanism may be a credential that may be pushed to a device of one or more of the other users when the other users are at or nearby the location or may be information of the other users that may be matched during transaction processing.

20 Claims, 5 Drawing Sheets

SHARED AUTHENTICATION FOR LIMITED USE OF AN ASSOCIATED ACCOUNT BASED ON USER LOCATION AND CONNECTED DEVICES

CROSS-REFERENCE TO RELATED APPLICATIONS

This application is a continuation of U.S. patent application Ser. No. 14/806,525, filed Jul. 22, 2016, which is incorporated herein by reference in its entirety.

TECHNICAL FIELD

The present application generally relates to authentication mechanisms for limited access to online accounts and more specifically to shared authentication for limited use of an associated account based on user location and connected devices.

BACKGROUND

A user or entity may own or otherwise be associated with a location as an administrator of the location (e.g., a management company or property owner), where the user/entity wishes to provide other users with access to the location. The other users may include guests or renters of the location, and may therefore utilize supplies and amenities for the location. Such supplies and amenities may be provided to the other users generally, such as stocks at the location, or may be agreed to between the owner/manager and the other users based on a rental or other type of agreement. Thus, the owner/manager of the location may wish to make sure that the owner/manager provides the supplies and amenities without the other users being required to purchase such costs and request reimbursement. The owner/manager may establish purchase accounts with nearby merchants; however, such accounts may be time consuming to establish, maintain, and manage for billing. Moreover, such accounts may open up the owner/manager to risk and potential fraud. The owner/manager may establish one account with a payment provider, but providing renters and other users with the account may be difficult to police and further present substantial risk to the owner/manager.

Figure 1:
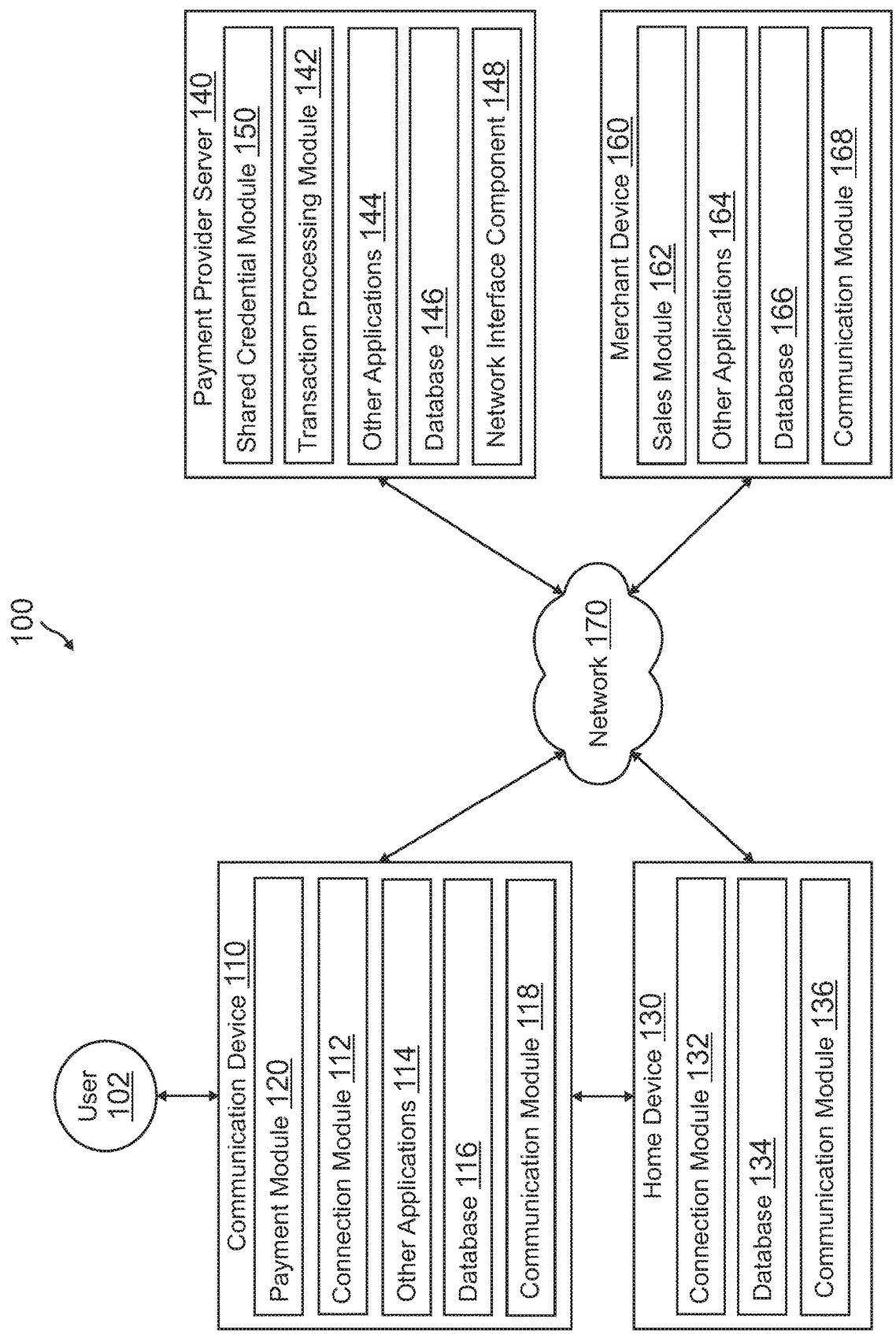
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for shared authentication for limited use of an associated account based on user location and connected devices. Systems suitable for practicing methods of the present disclosure are also provided.

A user (which may include entities as referred to herein, such as companies, groups of co-owners, individuals, etc.) may be an owner or other administrator of a property (referred to herein as a "location" or "locations"), such as a house, apartment, land, room, office, or other type of physical property that the user may hold ownership or management over. The user may allow other users to access the property, including guests, renters, potential buyers, and other types of groups which may be interested is visiting and/or utilizing the property. Additionally, the user having control of the property may provide utilities, supplies, and/or amenities on or for the property. For example, the controlling user may offer tissue products, food, drinks, soap, or other household items, as well as items that may be associated with other types of properties, such as business office buildings, farmland, animal ranches, etc. The controlling user may also provide for power, sewage, trash services, water, etc. Other types of property may include amenities offered with the property, for example, transportation, entertainment, beauty/spa services, etc. The items offered by the controlling user to other users may be purchasable and/or limited in quantity, so that the other users may be required to purchase the items from one or more merchant entities when the other users wish to use the items, restock the items, and/or access the items. Thus, if the property runs out of items limited in nature or if the other users wish to use an item that requires a merchant to provide the item or access to the item (e.g., power, transportation amenities, etc.), the merchants associated with the items may require payment. In such cases, the controlling user may wish to provide the payment so that the other users do not absorb the cost for the items or require reimbursement for the items.

The controlling user may establish a payment account with a payment provider. The payment account with the payment provider may allow for the controlling user to provide payments to merchants. For example, the payment provider may receive a transaction between the controlling user and a merchant, where the transaction includes a payment request to the merchant for one or more items for sale from the merchant. The payment provider may process the transaction by receiving authentication from the controlling user, including a login name, password, and/or personal identification number (PIN) for the payment account or other account information allowing access and use of the payment account. The authentication may include an encrypted token from the controlling user's communication device or a merchant device for the merchant where the authentication is entered to the merchant device of communicated to the merchant device from the user's communication device. The authentication may also include or correspond to information for the controlling user and/or transaction, for example, a location for the controlling user, transaction, and/or merchant, merchant information, biometrics, audio/video input, etc. Once the controlling user is authenticated, the payment provider may process the transaction by providing a payment for the payment request to the merchant through the merchant's device and/or a receiving account of the merchant (e.g., a financial account or another payment account with the payment provider).

However, the other users may be barred from using the controlling user's payment account absent the aforementioned authentication mechanism for authentication and use of the payment account. The controlling user may find that providing the authentication to the other users is too risky, as the authentication mechanism for the controlling user may allow the other users partial or unlimited access to the payment account so that the other users may purchase items not designated by the controlling user for use with the property. Thus, the controlling user may establish shared authentication with the other users for use of the payment account with the property that the other users visit, rent, tour, etc. When establishing shared authentication for the other users, the controlling user may set terms, required authentication, and/or other information that must be presented during a transaction by the other users. Thus, the required terms may dictate the shared authentication mechanism that must be provided to the payment provider for the other users to utilize the payment account of the controlling user. The controlling user may set the shared authentication as a digital token, such as a credential, that may be stored to one or more devices of the other users and communicated to the merchant during the transaction for payment. In other embodiments, the shared authentication may correspond to information for the transaction, other users, and/or merchant that must be present or matched during transaction processing for use of the controlling user's payment account. Additionally, the controlling user may utilize a combination of the aforementioned shared authentication information.

The controlling user may inform the other users of the shared authentication at the property, for example, through a rental agreement, information provided at the property, and/or information provided at a merchant location for an authorized merchant established by the controlling user with use of the payment account by the other users. Where the shared authentication corresponds to a digital token, such as a digital credential that is to be provided by the other users during a transaction for use of the payment account of the controlling user, the digital credential may be generated by the payment provider and communicated to a device associated with the property. The device associated with the property may correspond to a device located at the property, for example, a computer, Internet router, or other type of device. The device may store the digital credential for arrival of the other user(s). Once the other user(s) are located at or nearby the property, the other user(s)'s communication device may connect to the device associated with the property. The device associated with the property may communicate the digital credential to the other user(s)'s communication device for storage and presentation during a transaction as an authentication mechanism for the controlling user's payment account. In other embodiments, the digital credential may be communicated to the other user(s) when or after establishing that the other user(s) will utilize the property, such as when or after signing a digital rental agreement, over a network connection with the other user(s)'s communication device, through a message to the other user(s) communication device (e.g., an email, text, etc.), or otherwise transferred to the other user(s)'s communication device. Such transfer may occur after the other user(s) are detected as at or nearby the property, for example, through a location detection service or module (e.g., mapping, GPS, etc.). Moreover, the digital credential may only be transferred after the other user(s) are located at the property for a sufficient time or provide identification so that users quickly connecting to the device at the property may not receive the digital credential when not authorized. The information and/or credential may be loaded to the device when the user scans a barcode or enters another visible code at the property (e.g., a QR code, alphanumeric code, etc.).

The shared authentication set by the controlling user for use of the controlling user's payment account may correspond to information that may be required during the transaction. For example, the shared authentication may correspond to an authentication mechanism through matching the other user(s)'s information, the transaction information, the merchant information, and/or a combination of the aforementioned information. The information may also be supplied to the user and presented by the user during the transaction, such as a code, address, email address, or other information. The controlling user may allow for purchases from certain merchants, such as a boat rental for a lake nearby the property or breakfast at a nearby restaurant. The controlling user may also allow for only certain items to be purchased, certain merchants used, that the user's current location match the property location, and/or a transaction limit. The controlling user may require that the other user(s) be associated with the location at the time or previous to the transaction, for example, by being detected at or nearby the property and/or a length of time detected at or nearby the property. The shared authentication may correspond to a combination of the aforementioned information, thus, requiring both a digital token/credential to be presented during the transaction and having transaction, user, and/or merchant information match the shared authentication for use of the payment account by the other users.

Thus, the shared authentication may include limitations on use of the payment account by the other users. As previously discussed, information may be set for the shared authentication in order to utilize the payment account of the controlling user by the other user(s). For example, the controlling user may require that the user be detected as located on the property or at an authorized merchant and previously detected at the property. The controlling user may also limit use of the payment account by the other user(s) after authentication of the other user(s) using the shared authentication. In such embodiments, the controlling user may establish a limit on types of items, number of items, transaction pricing (e.g., total transaction limit in a single transaction, a limit on a total amount over multiple transactions, a limit on per item cost, etc.), merchants used, locations for the user or transaction (e.g., when generating the transaction), merchant locations, etc. Such limitations may prevent the other user(s) from using the payment account or limit the other user(s) usage of the payment account even if the authentication mechanism provided by the other user(s) matches the shared authentication set by the controlling user.

The user may not previous have an account and may utilize the account of the controlling user to purchase items by providing the account (e.g., through the aforementioned authentication mechanism) during a transaction. However, in other embodiments, the user may have an account and may only be authorized to purchase certain items through the controlling user's payment account. Thus, the other user(s) may visit a merchant, either physically or through an online portal (e.g., website, dedicated merchant application, etc.), where the other user(s) may generate a transaction for one or more items and provide an authentication mechanism established as the shared authentication for use of the payment account, the payment account for the controlling user may only be utilized based on the limitations set by the controlling user. Thus, other user attempts to purchase items not allowed by the controlling user, the user may be prevented from purchasing those items or may require another payment account associated with the user and not the controlling user. If the authentication mechanism matches the terms, information, or other shared authentication set by the controlling user, and the transaction is within the limitations, the payment provider may authorize use of the controlling user's payment account to pay for the transaction between the merchant and the other user(s).

The shared authentication may be further destroyed, deleted, or otherwise invalidated after certain occurrences set by the controlling user. For example, the controlling user may set a time period for validity of the shared authentication. The controlling user may also establish a transaction limit (e.g., number, price, etc.), after which the shared authentication is no longer valid for use of the payment account by the other user(s). The controlling user may also establish location limitation on use of the payment account, so that if the other user(s) are located a sufficient distance from the property and/or away from the property a certain amount of time, the shared authentication is no longer valid. The authentication mechanism may be invalidated with the payment provider, and may also be invalidated with any digital credential provided to the other user(s) after expiration set by the controlling user.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a home device 130, a payment provider server 140, and a merchant device 160 in communication over a network 170. User 102 may utilize communication device 110 to utilize the various features available for communication device 110, which may include processes to access and use services offered by payment provider server 140, for example, through a web site or online marketplace accessible through a web browser and/or dedicated payment application (e.g., mobile application of a mobile device) associated with payment provider server 140. Payment provider server 140 may provide payment account services that may be used to provide payment for items, which may refer to physical items, digital goods, and/or services. A user (not shown) in control of a property that user 102 visits (referring to in reference to FIG. 1 as a "controlling user") may establish a payment account with payment provider server 140. In order to allow user 102 to utilize the payment account, for example, for payments between user 102 and a merchant associated with merchant device 160, the controlling user may establish shared authentication for the payment account that may allow user 102 to receive limited and/or conditional use of the payment account while user 102 is associated with the property of the controlling user. User 102 may be detected at or nearby the property using communication device 110 and/or home device 130. The shared authentication may also be communicated to communication device 110, for example, by home device 130 when communication device 110 connects to home device 130 at or nearby the property or over network 170.

Communication device 110, home device 130, payment provider server 140, and merchant device 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with home device 130, payment provider server 140, and/or merchant device 160. For example, in one embodiment, communication device 110 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment module 120, a connection module 112, other applications 114, a database 116, and a communication module 118. Payment module 120 and other applications 114 may correspond to executable processes, procedures, and/or applications with associated hardware. In other embodiments, communication device 110 may include additional or different modules having specialized hardware and/or software as required.

Payment module 120 may correspond to one or more processes to execute modules and associated devices of communication device 110 to initiate, receive, and/or process/complete transactions with a merchant associated with merchant device 160 using a payment account associated with a controlling user for a property accessed, rented, visited, or otherwise associated with user 102 for a limited amount of time. In this regard, payment module 120 may correspond to specialized hardware and/or software utilized by communication device 110 to provide a convenient interface to permit user 102 to select payment options and provide payment for items, for example, to the merchant associated with merchant device 160 using payment provider server 140. Payment module 120 may be implemented as a user interface enabling user 102 to enter payment options for storage by communication device 110, select and provide payment options on checkout/payment of one or more items with the merchant corresponding to merchant device 160, and complete a transaction for the item(s) through a purchase request for the item(s). In various embodiments, payment module 120 may include a general browser application configured to retrieve, present, and communicate information over the Internet (e.g., utilize resources on the World Wide Web) or a private network. For example, payment module 120 may provide a web browser, which may send and receive information over network 170, including retrieving website information, presenting the website information to user 102, and/or communicating information to the website, including payment information. However, in other embodiments, payment module 120 may include a dedicated application of payment provider server 140 or other entity (e.g., a merchant), which may be configured to assist in processing purchase requests. Moreover, in other embodiments, payment provider server 140 may not perform transaction processing, and may instead correspond to another service provider, where payment module 120 may include processes to access and utilize service provided by such a service provider, for example, another type of account provider that may offer shared and limited authentication for use of an account of the controlling user by user 102.

User 102 may browse items for sale at a physical location, such as a merchant location for a merchant associated with merchant device 160. User 102 may also access an online marketplace or other website for the merchant. User 102 may select an item for purchase and generate or receive a transaction to purchase the item using payment module 120. For example, user 102 may wish to complete the transaction to purchase the item. User 102 may utilize payment module 120 to generate a purchase request for the transaction for the item(s) and provide or identify payment information to complete the transaction. Payment module 120 may utilize user financial information, such as a credit card, bank account, or other financial account, as a payment instrument when providing payment information for use in a purchase request. Additionally, payment module 120 may utilize a user account with payment provider, such as payment provider server 140, as the payment instrument. However, in the embodiments discussed herein, user 102 may wish to utilize a payment account with payment provider server 140 for the controlling user of a property that user 102 visits. Payment provider server 140 may therefore establish and provide shared authentication for the payment account associated with the controlling user for processing the transaction and providing payment to the merchant. The controlling user may establish the shared authentication with payment provider server 140, as discussed herein. Once the shared authentication is generated, user 102 may be provided with the authentication mechanism for shared authentication to utilize the payment account of the controlling user. For example, where the shared authentication corresponds to a digital token or credential, the credential may be communicated to communication device 110 for storage, for example, from home device 130 after a connection using connection module 112. Moreover, where the shared authentication corresponds to information required during a transaction, the controlling user may provide instructions that inform user 102 what information must be presented during the transaction for as the authentication mechanism for use of the payment account.

User 102 may therefore cause a transaction to be generated that includes a payment request to the merchant associated with merchant device 160 for one or more items for purchase. The transaction may be communicated to payment provider server 140 for processing to complete the transaction for the item using the user financial information. In various embodiments, the transaction may be communicated to merchant device 160 (e.g., as a payment token for the item) directly or over network 170 for communication to payment provider server 140, may be generated by merchant device 160 using an authentication mechanism for the payment account of the controlling user, or may be communicated to payment provider server 140 over network 170 (e.g., as a transaction established by user 102 through communication device 110 when accessing an online marketplace for the merchant associated with merchant device 160). The payment request may include identification of the transaction and a request to pay for the item(s) in the transaction using the payment account of the controlling user.

In order to authenticate user 102 for shared usage of the payment account in order to process the payment request and provide a payment to the merchant, user 102 may provide an authentication mechanism during the transaction. The authentication may correspond to a digital credential stored to communication device 110, where payment module 120 communicates the digital credential to one or more of payment provider server 140 and merchant device 160. Where the authentication mechanism includes or corresponds to information required during the transaction, communication device 110 may provide the information and/or one or more of payment provider server 140 and merchant device 160 may detect the information. Once the authentication mechanism is provided, payment provider server 140 may process the transaction. Payment module 112 may be utilized to view the results of the transaction and/or for viewing and storage of a transaction history, such as a receipt.

Connection module 112 may correspond to one or more processes to execute modules and associated specialized hardware of communication device 110 that may be used by user 102 of communication device 110 to establish a connection with home device 130 and/or merchant device 160, for example, to establish a location of user 102 (e.g., at a property owned by the controlling user and/or a merchant location for the merchant associated with merchant device 160) and/or to receive a digital credential as an authentication mechanism for shared authentication of a payment account for the controlling user. Connection module 112 may correspond to a specific application utilized by communication device 110. Connection module 112 may correspond to an application available over the Internet from a server. Connection module 112 may be set up to receive short range wireless communications with home device 130 to establish the connection. For example, home device 130 may communicate with communication device 110 and complete the connection process while user 102 is at or near home device 130. Home device 130 may be configured to transmit an identifier for reception by communication device 110. Home device 130 and communication device 110 may communicate using short range wireless communications, such as Bluetooth, Bluetooth Low Energy, WiFi, LTE Direct, near field communications, radio, infrared, etc.

Connection module 112 may execute in the background of an operating system of communication device 110 and be configured to establish connections, using communication module 118 of communication device 110, with home device 130. The connection may be established with or without user input from user 102. For example, home device 130 may broadcast a token, including a universally unique identifier (UUID), for reception by connection module 112. Connection module 112 may utilize communication module 118 of communication device 110 to receive the token from home device 130. If connection module 112 acknowledges the UUID as identifying home device 130 and/or the controlling user for the property, connection module 112 may transmit an identifier corresponding to user 102 and/or communication device 110 back to home device 130. Connection module 112 may utilize communication module 118 of communication device 110 to communicate with home device 130 (e.g., over near field communication, Bluetooth, Bluetooth Low Energy, radio, infrared, or other connection). The identifier from communication device 110 may include, be transmitted with, concatenated with, or otherwise bundled with the identifier received from home device 130. Identifiers may be transmitted as an encrypted token using public/private key(s) of communication device 110, home device 130, and/or payment provider server 140. Additionally, tokens may include a received identifier from the intended recipient of the token in addition to the transmitted identifier in order to identify the token's intended recipient. In other embodiments, home device 130 may act as a device emitting a connection request and discoverable using connection module 112 (e.g., an Internet router). In such embodiments, home device 130 may be located on the property and allow for connection after receiving a request to connect from connection module 112.

In various embodiments, one or more the discussed hardware and/or software features of payment module 120 and connection module 112 may be included in the same module.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications. Other applications 114 may also include other location detection applications, which may be used to determine a location for user 102, such as a mapping, compass, and/or GPS application, which can include a specialized GPS receiver that obtains location information for communication device 110 and determines a location of the device. Other applications may include social networking applications and/or merchant applications. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment module 120 and/or other applications 114, identifiers associated with hardware of communication device 110, or other appropriate identifiers, such as identifiers used for payment/user/device authentication or identification. Database 116 may include location information, such as obtained through the GPS receiver, which may be transmitted to payment provider server 140 and/or merchant device 160. Additionally, information used as an authentication mechanism may be stored to database 116, such as a digital token/credential and/or information required during a transaction.

Communication device 110 includes at least one communication module 118 adapted to communicate with home device 130, payment provider server 140, and/or merchant device 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Home device 130 may correspond to a device located at a property, which may be communicatively connected to communication device 110 when user 102 is located at the property with communication device 110. In various embodiments, home device 130 includes a processor, memory for storing received and/or transmitted information, and one or more communications modules which may provide network and/or short range wireless communication to home device 130, for example, over network 170 or using Bluetooth Low Energy, LTE Direct, WiFi, radio frequency, infrared, Bluetooth, and near field communications. In this regard, home device 130 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Home device 130 may also correspond to a device enabling transfer of data information over the Internet. In various embodiments, home device 130 may include a DSL (e.g., Digital Subscriber Line) modem, a PSTN (Public Switched Telephone Network) modem, an Ethernet device, a WiFi device, a broadband device, a satellite device and/or various other types of wired and/or wireless network communication devices. Home device 130 may provide a protected wireless network utilized to communicate with other computer networks, including the Internet. For example, home device 130 may provide a WiFi network. Home device 130 may be password and/or key protected and users may be required to pay for use of, or amount of data transmitted over, the network. Home device 130 may communicate directly with communication device 110 using short range communications, such as BLE, radio frequency, infrared, Bluetooth, and near field communications or over network 160. Home device 130 may be located on a property associated with a controlling user that user 102 visits, rents, or otherwise utilizes. Thus, home device 130 may be used to detect a location of user 102 as located at or nearby the property and may further be used to provide a digital credential to communication device 110 that allows user 102 to utilize a payment account of the controlling user with payment provider server 140. Although a device is shown, the device may be managed or controlled by any suitable processing device. Also, while only one device is shown, a plurality of devices may function similarly.

Home device 130 of FIG. 1 contains a connection module 132, a database 134, and a communication module 136. Connection module 132 may correspond to executable processes, procedures, and/or applications with associated hardware. In other embodiments, home device 130 may include additional or different modules having specialized hardware and/or software as required.

Connection module 132 may correspond to one or more processes to execute modules and associated specialized hardware of home device 130 that may be used to establish a connection with communication device 110, for example, to detect a location of user 102 (e.g., at a property owned by the controlling user) and/or to communicate a digital credential as an authentication mechanism for shared authentication of a payment account for the controlling user to communication device 110. Connection module 132 may be set up to transmit and receive short range wireless communications with communication device 110 to establish the connection. For example, home device 130 may communicate with communication device 110 and complete the connection process while user 102 is at or near home device 130. Home device 130 may be configured to transmit an identifier for reception by communication device 110. Home device 130 and communication device 110 may communicate using short range wireless communications, such as Bluetooth, Bluetooth Low Energy, WiFi, LTE Direct, near field communications, radio, infrared, etc.

For example, home device 130 may broadcast a token, including a universally unique identifier (UUID), for reception by connection module 112. Connection module 132 may utilize communication module 136 of home device 130 to broadcast the token from home device 130. If connection module 112 acknowledges the UUID as identifying home device 130 and/or the controlling user for the property, connection module 132 may connect with communication device 110 in order to receive an identifier corresponding to user 102 and/or communication device 110. Connection module 132 may utilize communication module 136 of home device 130 to communicate with communication device 110 (e.g., over near field communication, Bluetooth, Bluetooth Low Energy, radio, infrared, or other connection). The identifier from communication device 110 may include, be transmitted with, concatenated with, or otherwise bundled with the identifier from home device 130 in order to recognize the received information as requesting a connection with communication device 110. Identifiers may be transmitted as an encrypted token using public/private key(s) of communication device 110, home device 130, and/or payment provider server 140. In other embodiments, home device 130 may act as a device emitting a connection request and discoverable using connection module 132 (e.g., an Internet router). In such embodiments, home device 130 may be located on the property and allow for connection after receiving a request to connect from connection module 132.

Once a connection is established with communication device 110, connection module 132 may be used to determine a location for user 102, for example, based on the established connection. Additionally, after a connection is established between communication device 110 and home device 130, connection module 132 may further be used to communicate a digital credential stored to database 134 to communication device 110. For example, payment provider server 140 may determine a digital credential used to provide shared authentication of a payment account by a controlling user of a property associated with home device 130, as discussed herein. After generation, payment provider server 140 may communicate the digital credential to home device 130 for storage and future communication to communication device 110. Once connection module 132 connects to communication device 110 while user 102 is at or nearby the property associated with home device 130, connection module 132 may transmit the digital credential to communication device 110 for usage. In various embodiments, home device 130 may further check a list of authorized users/devices to receive the digital credential, for example, stored to database 134 or accessible from payment provider server 140. If user 102 and/or communication device 110 is authorized to receive the digital credential, only then may connection module 132 communicate the digital credential to communication device 110.

Home device 130 may further include database 134 stored to a transitory and/or non-transitory memory of communication device 110, which may store various applications and data and be utilized during execution of various modules of communication device 110. Thus, database 134 may include, for example, identifiers such as operating system registry entries, cookies associated with connection module 132, identifiers associated with hardware of home device 130, or other appropriate identifiers, such as identifiers used during broadcasting connection requests and/or received identifiers used to connect with a device (e.g., communication device 110). Database 134 may include information used to determine a location of user 102, such as a current and/or completed connection with communication device 110, which may be transmitted to payment provider server 140. Additionally, information used as an authentication mechanism may be stored to database 134, such as a digital token/credential and/or information required during a transaction.

Home device 130 includes at least one communication module 136 adapted to communicate with communication device 110, payment provider server 140, and/or merchant device 160. In various embodiments, communication module 136 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 136 may communicate directly with nearby devices using short range communications, such as Bluetooth Low Energy, LTE Direct, WiFi, radio frequency, infrared, Bluetooth, and near field communications.

Payment provider server 140 may be maintained, for example, by an online payment service provider, which may provide payment services and/or processing for financial transactions on behalf of users. In this regard, payment provider server 140 includes one or more processing applications which may be configured to interact with communication device 110, home device 130, merchant device 160, and/or another device/server to facilitate payment for a transaction, including establishment of payment accounts and generation of a shared authentication having an authentication mechanism allow other users than a primary use to utilize the payment account during transaction processing. In one example, payment provider server 140 may be provided by PAYPAL®, Inc. of San Jose, Calif., USA. However, in other embodiments, payment provider server 140 may be maintained by or include a credit provider, financial services provider, financial data provider, and/or other service provider, which may provide payment services to user 102.

Payment provider server 140 of FIG. 1 includes shared credential module 150, a transaction processing module 142, other applications 144, a database 146, and a network interface component 148. Shared credential module 150, transaction processing module 142, and other applications 144 may correspond to executable processes, procedures, and/or applications with associated hardware. In other embodiments, payment provider server 140 may include additional or different modules having specialized hardware and/or software as required.

Shared credential module 150 may correspond to one or more processes to execute modules and associated specialized hardware of payment provider server 140 to receive and/or transmit information from communication device 110 and/or a communication device of a controlling user of a property associated with the controlling user to determine an authentication mechanism used for shared authentication of a payment account of the controlling user and alert user 102 of the authentication mechanism. In this regard, shared credential module 150 may correspond to specialized hardware and/or software to establish shared authentication with the user 102 for use of the payment account of the controlling user for the property that user 102 visits, rents, tours, etc. When establishing shared authentication for user 102, the controlling user may set terms, required authentication, and/or other information that must be presented during a transaction by the user 102. For example, the controlling user 102 may require a digital token or credential to be supplied to payment provider server 140 during the transaction and/or may require that user, merchant, and/or transaction information to be matched to required information by the controlling user. Thus, the shared authentication may correspond to an authentication mechanism having one or more of the aforementioned requirements. In order to inform user 102 of the authentication mechanism allowing for shared authentication when using a payment account for the controlling user, the controlling user may inform user 102 of the authentication mechanism through information provided at the property, through a rental agreement, and/or information provided at a merchant location for an authorized merchant established by the controlling user with use of the payment account by user 102.

A digital credential may be provided to user 102 for use during a transaction for use of the payment account of the controlling user. The digital credential may be generated by shared credential module 150 and may correspond to a digital token, which may be encrypted, and include information uniquely identifying the payment account of the controlling user and authorizing user 102 to utilize the payment account. The digital credential may be communicated to home device 130 associated with the property. Home device 130 may store the digital credential for arrival of user 102 and connection with communication device 110, as discussed herein. Thus, home device 130 may communicate the digital credential to communication device 110 for storage and presentation during a transaction as an authentication mechanism for the controlling user's payment account. In other embodiments, the digital credential may be communicated to communication device 110 when or after establishing that user 102 will utilize the property, such as when or after signing a digital rental agreement, over a network connection with communication device 110, through a message to communication device 110, or otherwise transferred to communication device 110. Such transfer may occur after user 102 is detected as at or nearby the property (e.g., through mapping, GPS, triangulation of communication device 110, etc.). Moreover, the digital credential may only be transferred after communication device 110 is located at the property for a sufficient time or provide identification of user 102 as located at the property.

In other embodiments, the controlling user may require that user 102 provide certain information during the transaction as the authentication mechanism for shared authentication, such as user, merchant, and/or transaction information. For example, the controlling user may only allow for purchases from certain merchants so that if the controlling user's name, account identifier, or other identification is provided during the transaction at the merchant, user 102 may be authenticated for use of the payment account of the controlling user. The controlling user may also allow for only certain items to be purchased, certain merchants used, that user 102's current location match the property location, and/or a transaction limit. The controlling user may require that user 102 be associated with the location at the time or previous to the transaction, for example, by being detected at or nearby the property and/or a length of time detected at or nearby the property. The shared authentication may correspond to a combination of the aforementioned information, thus, requiring both a digital token/credential to be presented during the transaction and having transaction, user, and/or merchant information match the shared authentication for use of the payment account by user 102. Once the controlling user sets the authentication for the controlling user's payment account with shared credential module 150, shared credential module 150 may associate the authentication mechanism with the payment account so that when transaction processing module 142 receives the authentication mechanism during transaction processing, transaction processing module 142 may authenticate user 102 and allow use of the payment account for payment of the transaction.

When establishing that user 102 may have shared authentication to the payment account of the controlling user using one or more of the aforementioned authentication mechanisms, the controlling user may also set limitations on use of the payment account after authentication by user 102. For example, the controlling user may require that user 102 be detected as located on the property or at an authorized merchant and previously detected at the property. The controlling user may also limit use of the payment account by user 102 after authentication of user 102 using the authentication mechanism, such as a limit on types of items, number of items, transaction pricing (e.g., total transaction limit in a single transaction, a limit on a total amount over multiple transactions, a limit on per item cost, etc.), merchants used, locations for the user or transaction (e.g., when generating the transaction), merchant locations, or other limitation. Limitations on use of the payment account may prevent user 102 from freely using the payment account, and may insure that user 102 only uses the payment account for transactions within the limitations. Thus, if user 102 generates a transaction at a physical or digital merchant marketplace and provides the authentication mechanism established as the shared authentication for use of the payment account by user 102, the information during generation of the transaction must meet or be within the limits of the limitations. The controlling user may provide the limitations to shared credential module 150, which may associate the limitations with the authentication for the shared authentication of the payment account.

The controlling user may also utilize shared credential module 150 to set preferences for destruction, deletion, and/or invalidation of the shared authentication's authentication mechanism after certain occurrences set by the controlling user. For example, the controlling user may set a time period for validity, a transaction limit (e.g., number, price, etc.), after which the shared authentication is no longer valid for use of the payment account by the other user(s), and/or a location limitation on use of the payment account, so that if user 102 leaves the property associated with the shared authentication and the controlling user, the authentication mechanism becomes invalidated. Shared credential module 150 may invalidate the authentication mechanism with payment provider server 140 after expiration set by the controlling user so that user 102 may no longer use the payment account of the controlling user with transaction processing module 142.

Transaction processing module 142 may correspond to one or more processes to execute modules and associated specialized hardware of payment provider server 140 to receive and/or transmit information from communication device 110 for establishing payment accounts for user 102 and another controlling user of a property associated with the controlling user, processing and completing of one or more transactions initiated by user 102 using the payment accounts, and utilizing a shared authentication and limitations on usage of an account to process such transactions using the authentication mechanism for the shared authentication. In this regard, transaction processing module 142 may correspond to specialized hardware and/or software to establish payment accounts, which may be utilized to send and receive payments and monetary transfers and engage in other financial transactions. A controlling user for a property accessed by user 102 may establish a payment account with transaction processing module 142 by providing personal and/or financial information to payment provider server 140 and selecting an account login, password, and other security information. As discussed herein, the controlling user may provide for shared authentication with user 102 so that user 102 may receive an authentication mechanism allowing limited access and/or use of the payment account while user 102 is associated with the property. The payment account may be accessed and/or used through a browser application and/or dedicated payment application executed by communication device 110, such as an application associated with payment module 120. Thus, payment provider server 140 may protect and limit use of the payment account or other payment services offered by payment provider server 140 using authentication required by the controlling user. In other embodiments, payment provider server 140 may correspond to another type of service provider and transaction processing module 142 may correspond to another type of service module, which may require authentication and provide limited use shared authentication as discussed herein.

Transaction processing module 142 may alert user 102 of creation of the limited use authentication credential prior to inoperability of communication device 110. In various embodiments, transaction processing module 142 may request a certain type of current information for generation of the limited use authentication credential or user 102 may provide certain information. However, in other embodiments, transaction processing module 142 may inform user 102 of the information required to authenticate user 102 using the limited use authentication credential, which may include what user 102 and/or a merchant associated with merchant device 160 should image, record, or otherwise capture when user 102 wishes to authenticate an action between the user and the merchant, where the action requires some response by payment provider server 140 (e.g., transaction authorization and payment). Transaction processing module 142 may also alert user 102 of the validity term(s) for the limited use authentication credential so that user 102 is aware of the limits on use of the limited use authentication credential for authenticating user 102's actions. Transaction processing module 142 may then store the limited use authentication credential with database 146 for use when data is received from merchant device 160 requesting authentication through the limited use authentication credential. Moreover, on detection of communication device 110 becoming operable after inoperability, transaction processing module 142 may delete, invalidate, or otherwise terminate the limited use authentication credential. Transaction processing module 142 may do likewise on expiration of one or more validity terms for the limited use authentication credential.

Transaction processing module 142 may further process a received transaction from communication device 110 and/or merchant device 160 by receiving the transaction having a payment request for a payment for the transaction. Where communication device 110 communicates the transaction and payment request to payment provider server 140, the payment request may correspond to a payment token, including a payment instrument and identification of the transaction, and may be encrypted prior to transmission to transaction processing module 142 to prevent unauthorized receipt of a payment instrument. The payment token may include information corresponding to user identifiers, user financial information/identifiers, transaction information and/or other identifiers. Additionally, the payment token may include a payment amount and terms of payment for the transaction. The payment token may further include an authentication mechanism used by user 102 as shared authentication for a payment account of a controlling user of a property accessed by user 102. Once the transaction is received and user 102 is authenticated, transaction processing module 142 may utilize the payment account for the controlling user to render payment for the transaction if the authentication mechanism matches the required authentication for the shared authentication. Payment may be made to merchant device 160 or another user device using the payment instrument and the terms of the payment request, or may be made to an account for a merchant associated with merchant device 160. Additionally, transaction processing module 142 may provide transaction histories, including receipts, to communication device 110 and/or merchant device 160, or may store the transaction histories to controlling user's account and/or the merchant's account.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 170, or other types of applications. Other applications 144 may contain software programs, executable by a processor, including a graphical user interface (GUI), configured to provide an interface to user 102 when accessing payment provider server 134, where user 102 or other users may interact with the GUI to more easily view and communicate information. In various embodiments where not provided by transaction processing module 142, other applications 144 may include connection and/or communication applications, which may be utilized to communicate information to over network 170.

Additionally, payment provider server 140 includes database 146. As previously discussed, the controlling user and/or the merchant corresponding to merchant device 160 may establish one or more payment accounts with payment provider server 140. Payment accounts in database 146 may include user/merchant information, such as name, address, birthdate, payment/funding information, additional user financial information, and/or other desired user data. The controlling user and/or the merchant may link to their respective payment accounts through an account, user, merchant, and/or device identifier. Thus, when an identifier is transmitted to payment provider server 140, e.g. from communication device 110 and/or merchant device 160, a payment account belonging to the controlling use and/or the merchant may be found. Database 146 may also store the authentication mechanism allowing for shared authentication of user 102 with the controlling user's payment account, as well as identifiers used to identify the controlling user's payment account when submitted by user 102. Payment amounts may be deducted from one payment account and paid to another payment account.

In various embodiments, payment provider server 140 includes at least one network interface component 148 adapted to communicate communication device 110, home device 130, and/or merchant device 160 over network 170. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

A physical merchant location may correspond to merchant device 160, which may correspond to a point of sale (POS) and/or check-out machine/device. Merchant device 160 may be maintained, for example, by a merchant or seller offering various items, products, and/or services through the physical merchant location. Generally, merchant device 160 may be maintained by anyone or any entity that receives money, which includes charities as well as retailers and restaurants. In this regard, merchant device 160 may include a device having processing applications, which may be configured to interact with communication device 110 and/or payment provider server 140 to facilitate the sale of items using one or more authentication mechanisms for the payment account.

Merchant device 160 may be implemented using any appropriate hardware and software configured for wired and/or wireless communication with communication device 110 and/or payment provider server 140. For example, in one embodiment, merchant device 160 may be implemented as a single or networked personal computer (PC), a smart phone, laptop computer, wearable computing device, and/or other types of computing devices at a merchant location capable of transmitting and/or receiving data. Although a merchant device is shown, the merchant device may be managed or controlled by any suitable processing device. Although only one merchant device is shown, a plurality of merchant devices may function similarly.

Merchant device 160 of FIG. 1 contains a sales module 162, other applications 164, a database 166, and a communication module 168. Sales module 162 and other applications 164 may correspond to processes, procedures, and/or applications executable by a hardware processor, for example, a software program. In other embodiments, merchant device 160 may include additional or different modules having specialized hardware and/or software as required.

Sales module 162 may correspond to one or more processes to execute modules and associated specialized hardware of merchant device 160 that provide checkout and payment processes, which may be configured to complete transactions for items. In this regard, sales module 162 may correspond to specialized hardware and/or software of merchant device 160 to provide a convenient interface to permit a merchant to enter, view, and/or edit items and/or services for purchase by user 102. For example, sales module 162 may be implemented as an application having a user interface enabling the merchant to enter item information and request payment for a transaction on checkout/payment of one or more items/services. In certain embodiments, sales module 162 may correspond more generally to a web browser configured to view information available over the Internet or access a website corresponding to the merchant and/or payment provider server 140. Sales module 160 may provide item sales through an online marketplace using the website of the merchant.

Once a payment amount is determined for a transaction for items to be purchased by user 102, sales module 162 may request payment from user 102. Payment module 120 and sales module 162 may interact to complete payment using payment provider server 140, as discussed herein. As user 102 is not the primary holder of a payment account used for payment of a payment request in the transaction, payment module 120 and/or sales module 162 may further provide an authentication mechanism established by the controlling user of a property for use of the payment account by user 102. The authentication mechanism may correspond to the digital credential and/or required information determined by payment provider server 140. Thus, the information input by user 102 may correspond to the information used to authenticate user 102 using the shared authentication's authentication mechanism. As previously discussed, merchant device 160 may scan the information, input the information using an input device, image the information with a camera or video recorder, detect the location, record an audio recording with a microphone, capture a biometric using a sensor, or otherwise input the information. The provided information may then be used as an authentication credential and communicated to payment provider server 140 with the transaction and transaction information by sales module 162 for approval. As discussed herein, payment provider server 140 may perform matching on the provided credential information and the stored shared authentication's authentication mechanism and determine whether to approve or decline the transaction. Sales module 162 may then receive the results of the credential and transaction processing, and complete the transaction with user 102, for example, by providing the user the items for the transaction or declining the transaction where user 102 is not authenticated or the transaction is not authorized (e.g., insufficient funds).

Merchant device 160 includes other applications 164 as may be desired in particular embodiments to provide features to merchant device 160. For example, other applications 164 may include security applications for implementing client-side security features, programmatic client applications for interfacing with appropriate application programming interfaces (APIs) over network 170, or other types of applications. Other applications 164 may also include email, texting, voice and IM applications that allow a user to send and receive emails, calls, texts, and other notifications through network 170. In various embodiments, other applications 164 may include financial applications, such as banking, online payments, money transfer, or other applications associated with payment provider server 140. Other applications 144 may contain software programs, executable by a processor, including a graphical user interface (GUI) configured to provide an interface to the user.

Merchant device 160 may further include database 166 which may include, for example, identifiers such as operating system registry entries, cookies associated with sales module 162 and/or other applications 164, identifiers associated with hardware of merchant device 160, or other appropriate identifiers, such as identifiers used for payment/user/device authentication or identification. Identifiers in database 166 may be used by a payment/credit provider, such as payment provider server 140, to associate merchant device 160 with a particular account maintained by the payment/credit provider. Database 166 may further include a transaction between user 102 and a merchant corresponding to merchant device 160, as well as transaction information, input information for an authentication mechanism to authorize the transaction with payment provider server 140, and/or transaction confirmation and transaction histories.

Merchant device 160 includes at least one communication module 168 adapted to communicate with communication device 110 and/or payment provider server 140. In various embodiments, communication module 168 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
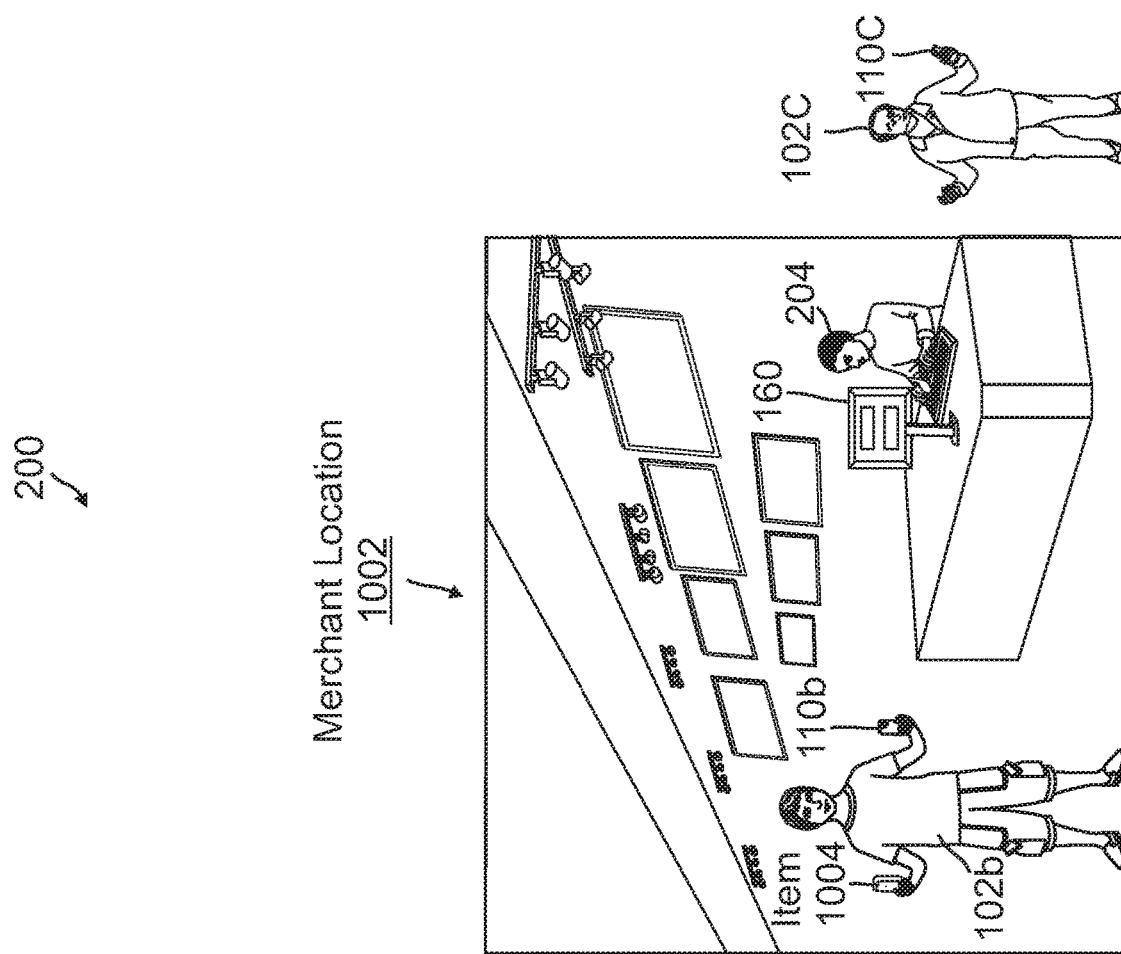
FIG. 2 is an environment where users may be associated with a home location, a merchant location, and a remote location, so that shared authentication may be issued based on transactions attempted at the various locations, according to an embodiment.
Figure 2:
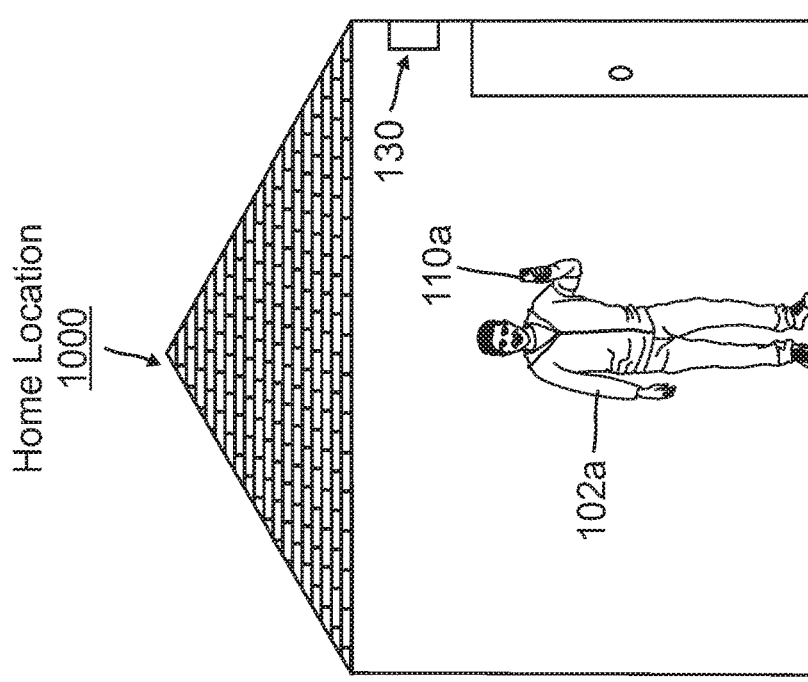

FIG. 2 is an environment where users may be associated with a home location, a merchant location, and a remote location, so that shared authentication may be issued based on transactions attempted at the various locations, according to an embodiment. Environment 200 includes a user 102a having a communication device 110a, a user 102b having a communication device 110b, and a user 102c having a communication 110c all corresponding generally to user 102 having communication device 110, respectively, from environment 100 of FIG. 1. Moreover, environment 200 includes home device 130 and merchant device 160 discussed in references to environment 100.

Environment 200 includes a home location 1000 and a merchant location 1002. Home location 1000 may correspond to a physical location, such as a property that user 102a, user 102b, and/or user 102c may visit, rent, or otherwise access for a limited amount of time. A controlling user (not shown) may own, rent, or otherwise control home location 1000, so that users 102a-c utilize home location 1000 with the authorization of the controlling user. While at home location 1000, user 102a-c may wish to purchase some item associated with home location 1000. For example, items associated with home location 1000 may include amenities, supplies, utilities, services (such as repair, delivery, or cleaning services), or other items used with home location 1000. In order to provide payment for the item(s) associated with home location 1000, the controlling user may wish to allow access and/or use of a payment account for the controlling user (e.g., managed and owned by the controlling user so that the controlling user is responsible for payments and account funds for the payment account). Thus, the controlling user may establish an authentication mechanism for users 102a-c that provides for shared authentication and use of the payment account.

In various embodiments, the authentication mechanism may correspond to information that must be presented during transaction processing for authentication of a user. For example, user 102a may utilize communication device 110a to access a website of a merchant and purchase an item, such as a food or house supplies delivery. While submitting the transaction, user 102a may be detected as located at home location 1000 and/or within a geo-fenced area associated with home location 1000 (e.g., within the property boundaries). User 102a may submit the transaction and request that a payment account for the controlling user of home location 1000 should be used to provide payment for the transaction. Thus, on receipt of the transaction having information identifying user 102a as located at or nearby home location 1000, a payment provider may utilize the information as the authentication mechanism allowing for shared authentication for user 102a with the payment account. The payment provider may then authenticate and process the transaction accordingly.

A digital credential may also be established as the authentication allowing for shared authentication of the payment account of the controlling user for home location 1000. For example, user 102b may be located at a merchant location 1002 and wish to purchase an item 1004. A merchant employee 204 may engage in a transaction with user 102b for item 1004, for example, by entering information to merchant device 160 in order to process the transaction. The transaction may be processed with a payment provider, which may require a payment account to provide payment for item 1004 to merchant employee 204. Previously, user 102b may connect to home device 130 using communication device 110b while user 102b is located at home location 1000. The connection between communication device 110b and home device 130 may cause a digital credential to be communicated to communication device 110b for storage. As discussed herein, the digital credential may act as an authentication mechanism allowing user 102b to utilize the payment account of the controlling user by providing the digital credential to merchant device 160 from communication device 110b. Thus, at merchant location 1002, user 102b may communicate the digital credential from communication device 110b to merchant device 160 allowing merchant employee 204 to send the transaction and digital credential to the payment provider for processing. Additionally, the payment provider may determine whether merchant location 1002 and/or the items/cost of the transaction is within the limits for usage of the account by user 102b prior to processing.

Moreover, if the authentication mechanism is not matched and/or a limit on use of the payment account is exceed, the payment provider may not process the transaction with the payment account to provide a payment for a payment request for items in the transaction. For example, user 102c is shown as not located at home location 1002 and/or merchant location 1002 where user 102c may utilize the controlling user's payment account. Thus, if user 102c attempts to utilize the payment account for the controlling user of home location 1000 by providing the payment account as a payment instrument during a transaction, user 102c may be prevented from completing the transaction and providing payment using the payment account. In such embodiments, the controlling user may request information from user 102c of why user 102c is initiating the transaction and/or may invalidate the authentication mechanism user 102c may try to utilize.

Figure 3:
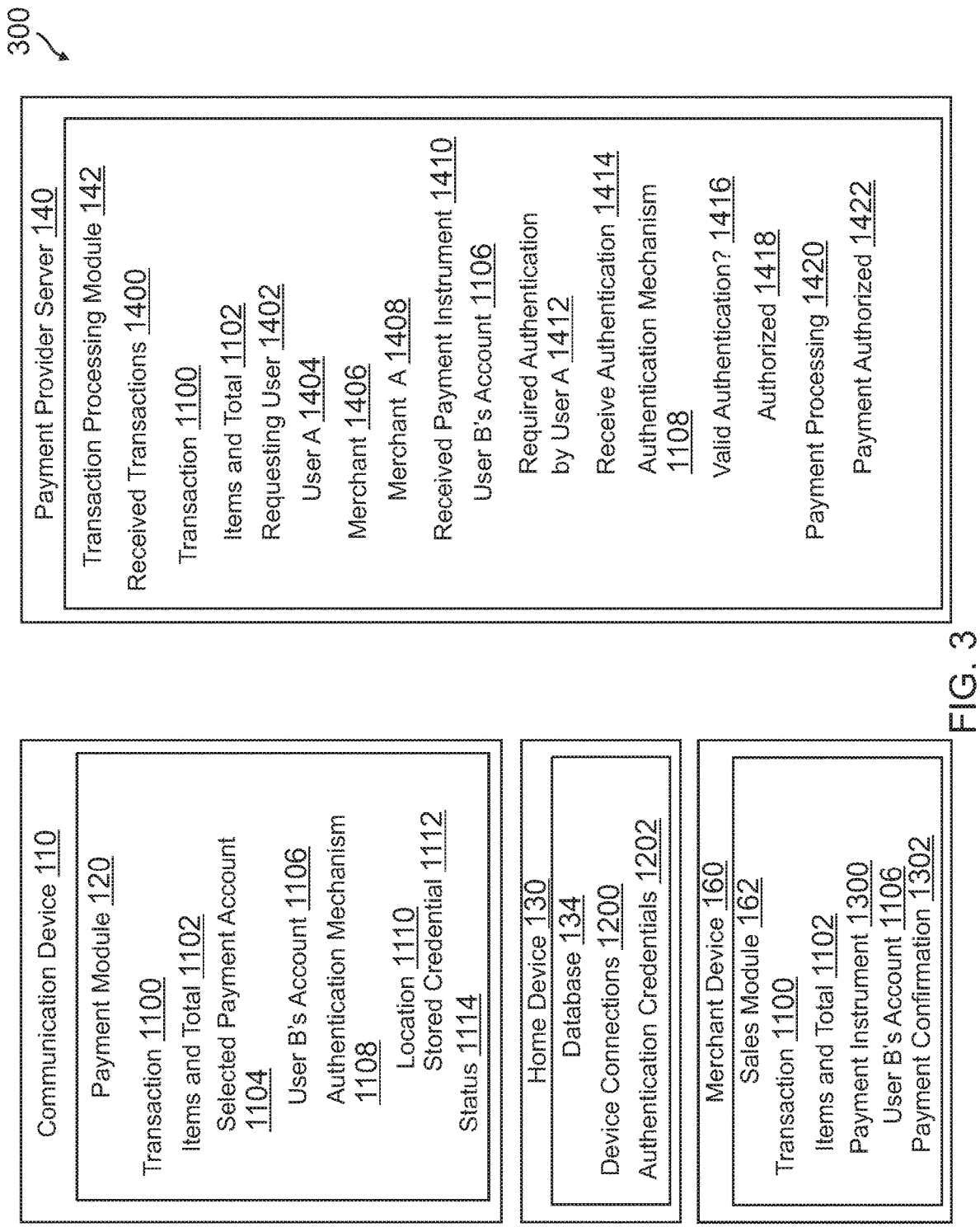
FIG. 3 is an exemplary interactions between a communication device, a home location device, a merchant device, and a payment provider to allow of shared use of a payment account based on shared authentication, according to an embodiment.

FIG. 3 is an exemplary interactions between a communication device, a home location device, a merchant device, and a payment provider to allow of shared use of a payment account based on shared authentication, according to an embodiment. Environment 300 of FIG. 3 includes communication device 110, a home device 130, a payment provider server 140, and a merchant device 160 from environment 100 of FIG. 1 executing module and processes discussed in reference to environment 100.

Communication device 110 executes payment module 120 corresponding generally to the specialized hardware and/or software modules and processes described in reference to FIG. 1. In this regard, payment module 120 may be used by a user A (not shown) of communication device 110 to provide an authentication mechanism used to process and complete a transaction using a payment account for a controlling user B of a property accessed by the user A. For example, payment module 120 includes a transaction 1000 for one or more times included within items and total 1102. In order to provide payment for the total price/cost within items and total 1102, payment module 120 may include a selected payment account 1104, such as user B's account 1106. In order to utilize user B's account 1106, user A may include an authentication mechanism 1008, such as a location 1110 and/or a stored credential 1112. While waiting for the results of transaction processing from transaction 1100 using user B's account 1106 and/or after receiving the results, payment module 120 may include a status 1114 for transaction 1100.

In various embodiments, stored credential 1112 may be received from home device 130, which includes database 134 stored to a non-transitory memory of home device 130. For example, payment provider server 140 may determine stored credential 1112 as a digital token/credential allowing for shared authentication of user B's account 1106. In such embodiments, payment provider server 140 may communicate stored credential 1112 to home device 130 for storage in database 134. In such embodiments, home device 130 may form one or more of device connections 1200, which may further be used to determine location 1110 of user A through a connection between communication device 110 and home device 130. Additionally, device connections 1200 may be used to provide authentication credentials 1202 to one or more other devices.

Payment provider server 140 executes transaction processing module 142 corresponding generally to the specialized hardware and/or software modules and processes described in reference to FIG. 1. In this regard, transaction processing module 142 may be used to process received transaction 1400, for example, transaction 1400 established by payment module 120 of communication device 110. Transaction processing module 142 may process information received for transaction 1100 to determine whether to utilize user B's account 1106 for payment of items and total 1102. Thus, transaction 1100 includes information for a requesting user 1402 for payment of transaction 1100, that is user A 1404. Additionally, transaction processing module 142 may determine merchant 1406 for transaction 1100, such as merchant A 1408.

In order to pay for items and total 1102, user A may provide a received payment instrument 1410 allowing for transaction processing. Received payment instrument 1410 may include user B's account 1106, as previously discussed. In order to authenticate allowance of use of user B's account 1106, transaction processing module 142 may include information for required authentication by user A 1412, for example, a digital credential and/or information. Transaction processing module 142 may perform matching on required authentication by user A 1412 to received authentication 1414, such as authentication mechanism 1108 in order to determine whether there is valid authentication 1416. If so, transaction processing module 142 may set transaction 1100's status to authorized 1418, where payment processing 1420 is performed to provide payment authorized 1422 to a merchant of merchant device 160

Merchant device 160 executes sales module 162 corresponding generally to the specialized hardware and/or software modules and processes described in reference to FIG. 1. In this regard, sales module 162 may be used to generate a transaction, receive information for a credential by a user, and submit the transaction and credential information to payment provider server 140 for approval. Thus, sales module 1542 includes transaction 1100 having items and total 1102, which may be communicated to communication device 110 and/or payment provider server 140. Transaction 1100 further includes a payment instrument 1300, such as user B's account 1106. After transaction processing module 142 performs transaction processing, sales module 162 may further include payment confirmation 1302.

Figure 4:
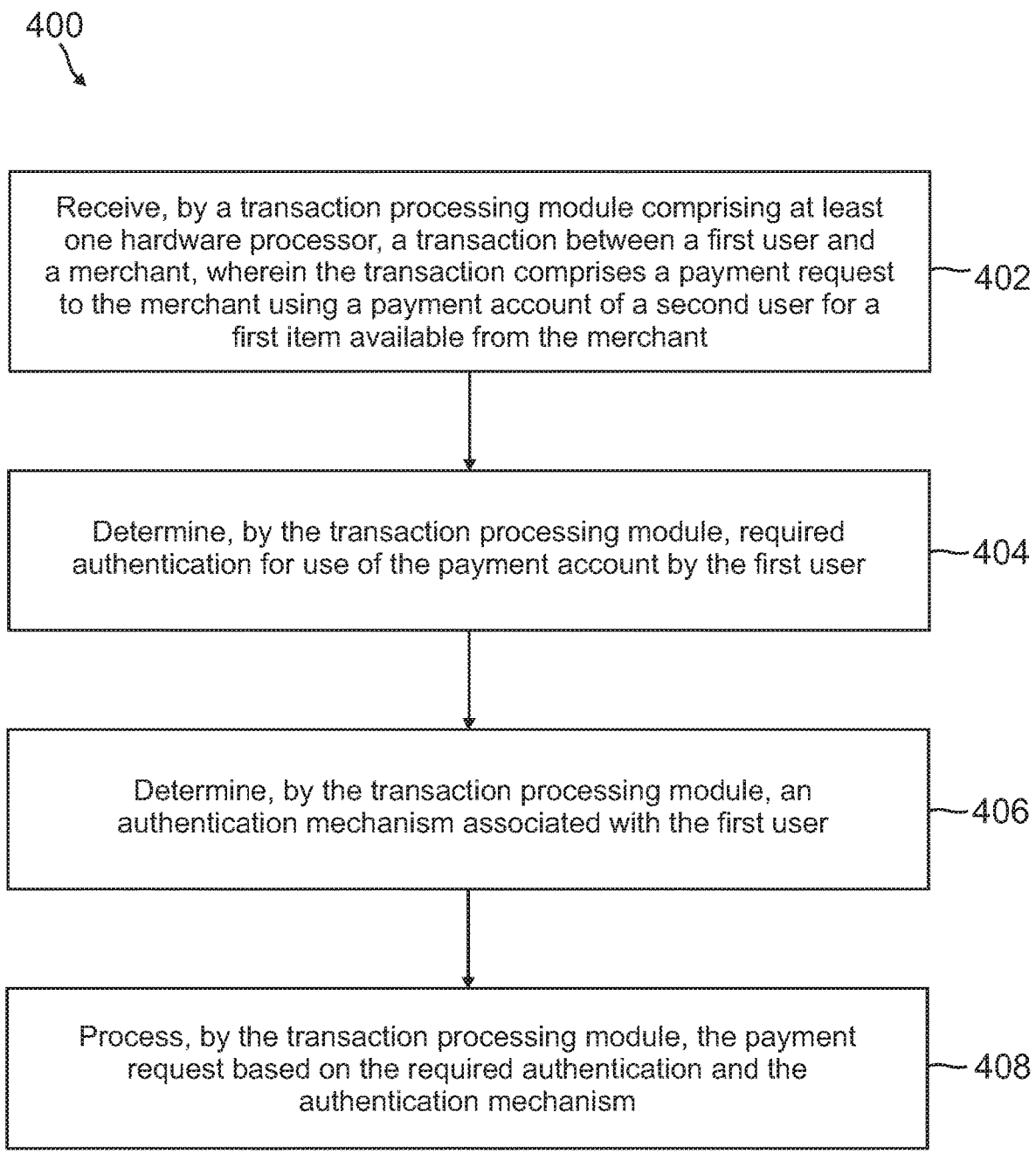
FIG. 4 is a flowchart of an exemplary process for shared authentication for limited use of an associated account based on user location and connected devices, according to an embodiment.

FIG. 4 is a flowchart of an exemplary process for shared authentication for limited use of an associated account based on user location and connected devices, according to an embodiment. Note that one or more steps, processes, and methods described herein may be omitted, performed in a different sequence, or combined as desired or appropriate.

At step 402 of flowchart 400, a transaction between a first user and a merchant is received, by a transaction processing module comprising at least one hardware processor, wherein the transaction comprises a payment request to the merchant using a payment account of a second user for an item available from the merchant. The second user may be a user that owns, rents, manages, or otherwise controls a property visited by the first user. Thus, at step 404, required authentication for use of the payment account by the first user is determined, by the transaction processing module. For example, authentication required by the second user for use of the payment account by users different than the second user for items from designated merchants when the users are associated with a location owned by the second user may be accessed and/or determined. Thus, the second user may set required terms for use of the payment account by the first user when the first user is associated with a location owned by the second user. In various embodiments, the item(s) is/are specified in a rental agreement between the first user and the second user for the location. For example, the second user may specify designated merchants that comprise merchants contracted with the second user to sell items to the first user in the rental agreement, wherein the merchant is one of the designated merchants. Thus, the second user may specify the items from the designated merchants as items required for use of the location and items utilized for nearby locations to the location.

In order to set the terms and/or the required authentication, a shared credential module of the payment provider may access a request from the second user to generate a digital credential for shared use of the payment account by the first user and generate the digital credential. A network interface component may communicate the digital credential to a device at the location owned by the second user, and wherein the device communicates the digital credential to the communication device of the first user when the communication device of the first user connects to the device at the location. The digital credential may be requested by second user for first user when first user uses or rents the location. Moreover, the digital credential may become invalidated based on at least one of a time period set by second user, when the first user leaves the location or the proximity of the location, and when the communication device of the first user disconnects from the device at the location. In other embodiments, the shared credential module of the payment provider may access a request from the second user to set information for use of the payment account by the first user and establish the information with the payment account.

An authentication mechanism provided by the first user for processing the payment request to the merchant using the payment account is accessed, at step 406. The authentication mechanism comprises the digital credential received with the transaction from one of a communication device of the user and a merchant device of the merchant. For example, a digital authentication token may be communicated to a device of the first user for storage, wherein the device is one of a mobile phone, a wearable device, and a tablet computer. The authentication mechanism may also comprise current information collected for the first user during the transaction. The current information for the first user is collected by the communication device of the user using at least one of communication module connected to an external device or external sensor that captures the information, an input device, a camera, a microphone, an accelerometer, a motion detector, an environmental sensor, and a biometric sensor. The required information may also comprise a merchant location for the transaction or the merchant, wherein a current location for the user during the transaction in the current information matches the merchant location for use of the payment account by the first user. In other embodiments, the required the information may comprise the location owned by the second user, wherein the first user is detected at the location based on at least one of a connection with a device at the location, a geo-location of the first user, and a check-in by the first user.

The authentication credential may be one of received with the transaction and received after a request for the credential during the transaction. The payment request may be processed to provide a payment to the merchant for the item, at step 408. Additionally, use of the payment account by the first user is limited by one of the location owned by the second user, authorized nearby locations to the location, products for the location, and a rental agreement for the location. The second user may establish the limitations on use of the payment account, such as merchant limitations, location limitations, price limitations, item limitations, and time period limitations. Thus, determining the transaction is within the limitations may comprise determining the at least one of the merchant limitations, the location limitations, the price limitations, the item limitations, and the time period limitations set by the second user matches the transaction and/or transaction information.

Figure 5:
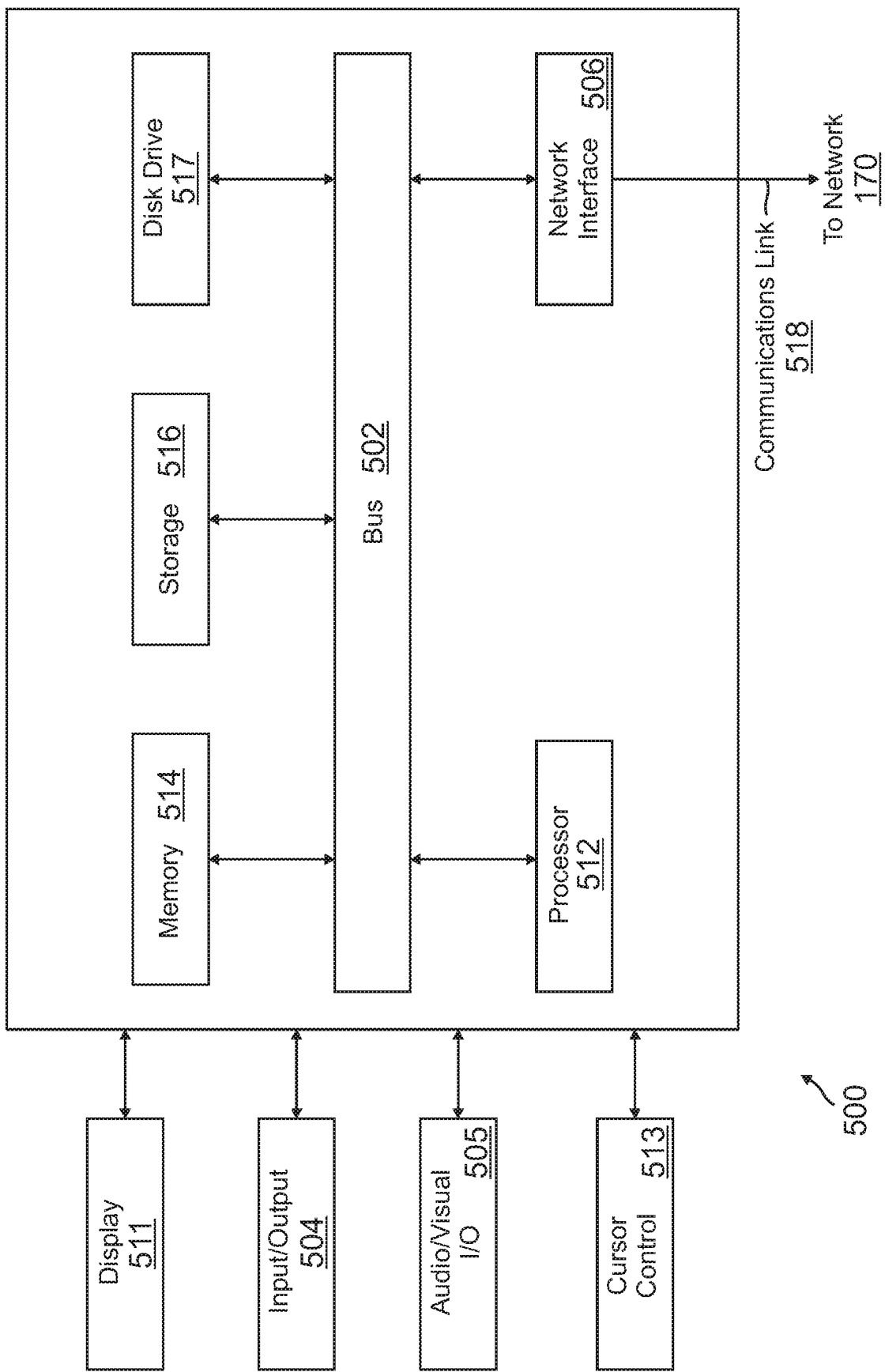
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing instructions; and
   one or more hardware processors coupled to the non-transitory memory and configured to read the instructions from the non-transitory memory to cause the system to perform operations comprising:
      establishing an authentication mechanism utilized by a first user device associated with a first user and a controlling second user device of a controlling user, the authentication mechanism facilitating processing of a transaction initiated by the first user device at an authorized location, wherein the authentication mechanism comprises a limited use digital token required from the first user device, the authorized location, and a list of at least one item to be purchased using a payment account of the controlling user;
      storing, over a network, locally to the controlling second user device at or within a proximity of the authorized location, the limited use digital token for transfer to the first user device when at or within the proximity of the authorized location;
      receiving, over the network, a transaction request from the first user device associated with the first user for processing the transaction;
      determining from the transaction request, a location of the first user device and an item for purchase;
      receiving, over the network, a limited use digital token from the first user device, the limited use digital token is received from the first user device from the controlling second user device;
      authenticating the transaction request based in part on a match of the item, the location, and the limited use digital token received from the first user device to an item from the list, the authorized location and the digital credential in the authentication mechanism; and
      processing the transaction request using the payment account of the controlling user associated with the authentication mechanism.

2. The system of claim 1, wherein the authentication mechanism includes a request to establish the limited use digital token for the first user device.

3. The system of claim 2, wherein in processing the transaction request, payment for the item in the transaction request is processed using the payment account of the controlling user associated with the controlling second user device.

4. The system of claim 1, wherein the authenticating is based on a confirmation that the location of the first user device is within a geo-fence area predefined as the authorized location in the authentication mechanism.

5. The system of claim 1, wherein the limited use digital token is generated by a payment provider system and communicated to the controlling second user device.

6. The system of claim 1, wherein the authentication mechanism further includes item costs; and
   wherein the processing the transaction request is denied if an item cost for the item does not match any of the item costs designated in the authentication mechanism.

7. The system of claim 1, wherein the authentication mechanism further includes terms for processing the transaction, and wherein the operations further comprise:
   invalidating the limited use digital token on the first user device of the first user based on an expiration of at least one of the terms or a violation of at least one of the terms.

8. A method comprising:
   establishing an authentication mechanism utilized by a first user device associated with a first user and a controlling second user device associated with a controlling second user, the authentication mechanism for authenticating processing of a transaction initiated by the first user device at an authorized location, wherein the authentication mechanism is associated with a digital credential required from the first user device for authenticating the processing of the transaction using a payment account of the controlling second user and the authentication mechanism includes the authorized location and a list of items;
   storing, over a network, locally to the controlling second user device at or within a proximity to the authorized location, the digital credential for transfer to the first user device when at or within the proximity to the authorized location;
   receiving, over the network, an encrypted payment request from a merchant for purchase of an item at a location, the payment request including a request for payment from the payment account of the controlling second user;
   determining that the payment request includes the digital credential obtained from the controlling second user device at or within the proximity of the location for purchasing the item;
   accessing the authentication mechanism by matching the digital credential in the payment request to the digital credential associated with the authentication mechanism;

authenticating, the payment request based in part on a match of the item for purchase at the location to an item from the list of items and the authorized location in the authentication mechanism; and processing the payment request from the payment account of the controlling user in response to the authenticating the payment request with the authentication mechanism.

9. The method of claim 8, wherein the authentication mechanism includes a request to establish the digital credential for the first user device associated with the first user.

10. The method of claim 9, wherein the authenticating is based on a confirmation that the location of the first user device is within a geo-fence area predefined as the authorized location in the authentication account.

11. The method of claim 8, wherein the digital credential is generated by a payment provider system and communicated to the first user device associated with the first user during the transaction.

12. The method of claim 8, wherein the authentication mechanism designates item costs associated with the list of items; and wherein the processing the payment request is denied if an item cost of the item does not match any of the item costs designated in the authentication mechanism.

13. The method of claim 8, wherein the authentication mechanism designates terms for processing the transaction and corresponding expiration times, and wherein the method further comprises:

invalidating the digital credential of the first user device of the first user based on an expiration time of at least one of the terms or a violation of at least one of the terms.

14. A non-transitory machine-readable medium having stored thereon machine-readable instructions executable to cause a machine to perform operations comprising:

generating an authentication mechanism utilized by a first user device of a first user and a controlling second user device for processing a transaction at an authorized location by the first user device, wherein the authentication mechanism comprises a digital credential required from the first user device to authenticate the processing of the transaction using a payment account of a controlling second user, the authorized location, and terms for processing the transaction;

storing, over a network, locally to the controlling second user device at or within a proximity to the authorized location, the digital credential for transfer to the first user device when at or within the proximity to the location;

receiving, over the network, from the first user device associated with the first user, a transaction request and a digital credential received at the first user device from the controlling second user device;

determining from the transaction request, a location of the first user device, and an item for purchase;

determining the authentication mechanism associated with the digital credential;

authenticating, with the authentication mechanism the transaction request from the first user device in part by matching the item and the location received in the transaction request to at least one of the terms and the authorized location in the authentication mechanism; and processing the transaction request using the payment account of the controlling second user based on at least one other of the terms established in the authentication mechanism.

15. The non-transitory machine-readable medium of claim 14, wherein the authentication mechanism includes a request to establish the digital credential for the first user device.

16. The non-transitory machine-readable medium of claim 14, wherein in processing the transaction request, payment for the item in the transaction request is processed using the payment account of the controlling second user associated with the controlling second user device.

17. The non-transitory machine-readable medium of claim 14, wherein the authenticating is based on a confirmation that the location of the first user device is within a geo-fence area that is the authorized location in the authentication mechanism.

18. The non-transitory machine-readable medium of claim 14, wherein the digital credential is generated by a payment provider system and communicated to the first user device during the transaction.

19. The non-transitory machine-readable medium of claim 14, wherein the operations further comprise:

invalidating the digital credential on the first user device of the first user based on at least one of a rarity of the items an expiration of at least one of the terms or a violation of at least one of the terms in the authentication mechanism.

20. The system of claim 1, whereby the limited use digital token is received at the first user device during the processing of the transaction when the first user device is in the proximity of the controlling second user device.

* * * * *